United States Patent [19]

Davies

[11] Patent Number: 5,045,941
[45] Date of Patent: Sep. 3, 1991

[54] FRAMING CODE WINDOWS REPOSITIONING APPARATUS AND METHOD FOR TELETEXT DECODER

[75] Inventor: Andrew K. Davies, Purley, England

[73] Assignee: U.S. Philips Corporation, New York, N.Y.

[21] Appl. No.: 534,799

[22] Filed: Jun. 7, 1990

[30] Foreign Application Priority Data

Jun. 16, 1989 [GB] United Kingdom ................ 8913905

[51] Int. Cl.⁵ .............................................. H04N 7/04
[52] U.S. Cl. .................................... 358/147; 358/146
[58] Field of Search ................ 358/142, 146, 147, 188

[56] References Cited

U.S. PATENT DOCUMENTS 4,841,365 6/1989 Guenat et al. ...................... 358/147

FOREIGN PATENT DOCUMENTS 3439941 8/1985 Fed. Rep. of Germany .

OTHER PUBLICATIONS

Broadcast Teletext Specification, Sep. 1976, pp. 1—20, published jointly by British Broadcasting Corporation, Independent Broadcasting Authority, British Radio Equipment Manufacturers' Assocation.

PHILIPA Data Handbook, "Video and Associated Systems-Bipolar, MOS", Book IC02 a, 1988, pp. 649–679.

RTC Laboratories D'Applications, "CMOS Interface for Data Acquisition & Control", PREVIEW Third Review), pp. 2–40, undated.

*Primary Examiner*—Victor R. Kostak
*Attorney, Agent, or Firm*—William Squire

[57] ABSTRACT

A teletext decoder includes a data acquisition and control circuit (DAC) which may be operated in either of two modes under the control of a microcontroller (MC). In one mode a framing code window used for detecting a framing code in received data pulses (D) is generated internally and is used in conjunction with data lines of a received video signal where teletext data is expected to occur. In the other mode a framing code window is generated externally by means of an applied line sync signal (S) and is used in conjunction with lines of a received video signal where teletext data is not expected to occur e.g. during ITS lines and normal picture lines. In this way the problem of "junk" data is greatly alleviated.

20 Claims, 2 Drawing Sheets

1

FRAMING CODE WINDOWS REPOSITIONING APPARATUS AND METHOD FOR TELETEXT DECODER

FIELD OF THE INVENTION

This invention relates to teletext decoders for use in a receiver which is suitable for receiving teletext transmissions of a type in which coded data pulses are transmitted in a television signal in television lines where no picture signals representing normal picture information are present e.g. in the field or vertical blanking interval (VBI). It is especially applicable to teletext decoders for use in receivers which are suitable for receiving teletext commercial data services (e.g. Packet 31) such as the BBC DATACAST teletext service and the IBA AIRCALL teletext service, and which outputs data to a compatible PC or other computer.

Of interest is copending application Ser. No. 534-775 filed concurrently herewith entitled "Teletex Decoders" in the name of the present inventor and assigned to the assignee of the present invention.

BACKGROUND OF THE INVENTION

Teletext decoders of this kind include a data acquisition and control circuit which operates on serial data derived from the received video signal and converts it into data bytes which are stored. One of the functions of the data acquisition and control circuit is to detect that the serial data which is being received is valid teletext data, and to reject it if it is not teletext data.

Teletext transmission formats are described in the documents "Broadcast Teletext Specification", September 1976, published in U.K. jointly by the British Broadcasting Corporation, the Independent Broadcasting Authority, the British Radio Equipment Manufacturers' Association, and "World System Teletext and Data Broadcasting System", December 1987, complied by the Department of Trade and Industry of the U.K. Government. Teletext data is normally transmitted in those lines of a television signal which are included in the field or vertical blanking interval thereof, i.e. lines 7 to 22 and lines 318 to 335 of a 625 line, 50 Hz field rate system. However, some of these lines, such as lines 19 and 20 and lines 332 and 333 may be used to transmit Insertion Test Signals (ITS) and it has been found that these signals can mimic teletext data with the result that non-teletext "junk" data is received which corrupts the valid teletext data. Non-teletext "junk" data can also arise from the normal picture information contained on the received video signal.

In order to alleviate this problem, it is arranged that the data acquisition and control circuit carries out a number of tests on the received serial data in order to determine whether it is valid teletext data or not. One of these tests is to determine whether the so-called framing code which follows the clock run-in bits of each data packet of teletext data occurs within a predetermined "window". If a valid framing code does not occur within this "window" then the relevant serial data is not acquired. Normally the framing code "window" is generated using the line sync signal derived from the received video signal as a reference, it being known that a valid framing code should occur a predetermined time period following the line sync signal.

Even using such a test it is still possible for non-teletext "junk" data to appear to contain a valid framing code in the framing code window, and therefore be passed as valid teletext data. The present invention is concerned with reducing the possibility of this happening.

One particular form of data acquisition and control integrated circuit marketed by Philips Components -type SAA 5250, commonly referred to as CIDAC (CMOS Interface for Data Acquisition and Control) has been designed primarily for use in connection with the French ANTIOPE teletext system. Details of this integrated circuit can be found in Philips Data Handbook, "Video and associated systems —Bipolar, MOS", Book ICO2a, 1988 and also in "CIDAC-CMOS Interface for Data Acquisition and Control" by RTC Laboratories Applications, Paris. CIDAC may be used in two alternative modes. In one mode, referred to as SYNC, a framing code window is generated internally from a line sync signal which is applied to the VALI/SYNC input of CIDAC. In its alternative mode, the signal applied to the VALI/SYNC input of CIDAC affords the framing code window directly.

SUMMARY OF THE INVENTION

It is one of the objects of the present invention to provide a teletext decoder which can include the CIDAC integrated circuit and which makes use of the alternative modes of operation in order to alleviate the problem of non teletext "junk" data.

According to one aspect of the present invention there is provided a teletext decoder for use in a receiver which is suitable for receiving teletext transmissions of a type in which coded data pulses representing teletext data packets are transmitted in a television signal in respective television lines where no picture signals representing normal picture information are present, the teletext decoder comprising framing code detection means operable on signals which derive from respective lines of the television signal for detecting a framing code therein in a predefined framing code window, characterised by means for changing the position of the framing code window in a television line in respect of signals which derive from lines in the television signal where teletext data packets do not occur, whereby the chances of detecting an apparently valid framing code in non-teletext signals are reduced.

The invention has the advantage that in shifting the position of the framing code window it is located in a position in which pulses resembling any part of the teletext data do not occur.

In carrying out the invention as aforesaid, the means for changing the position of the framing code window may be effective for moving it to a position where a framing code cannot exist in the non-teletext signals.

In a preferred decoder it will be arranged that the framing code detection means forms part of a data acquisition and control arrangement, in which case it may be operable in a first mode in which the framing code window is generated internally therein, and in a second mode in which the framing code window is defined by an applied signal.

Advantageously, it may be arranged that in the first mode, the framing code window is generated in time spaced relationship to an applied line sync signal and that in the second mode it is derived directly from the applied line sync signal. In the second mode the duration of the framing code window may be changed to substantially that of the applied line sync signal.

In an especially preferred arrangement, means are provided for generating a field sync signal from the television signal for causing the data acquisition and control arrangement to operate in its first mode, and means are also provided operable a predetermined time period after the field sync signal occurs for causing the data acquisition and control arrangement to operate in its second mode, the predetermined time period corresponding to a predetermined number of lines in the television signal in which the teletext data packets can occur.

Where the transmissions also contain television lines, particularly during the vertical blanking intervals which convey test signals, the decoder may additionally comprise means for detecting the presence of the test signal lines and for causing the framing code window to occupy its changed position during those lines.

The decoder may additionally comprise means for detecting television lines which do not contain teletext data packets and for causing the framing code window to occupy its changed position during those lines and this may be achieved by determining whether the television lines do or do not contain the clock run-in pulses of a teletext data packet.

According to a further aspect of the present invention there is provided a method of processing a received teletext transmission of a type in which coded data pulses representing teletext data packets are transmitted in a television signal in respective television lines where no picture signals representing normal picture information are present, the method comprising the steps of generating a framing code window, detecting a framing code in the framing code window in signals which derive from respective lines of the television signal, and characterised by the step of changing the position of said framing code window in a television line in respect of signals which derive from lines in the television signal where data packets do not occur, whereby the chances of detecting an apparently valid framing code in non-teletext signals are reduced.

IN THE DRAWING

An exemplary embodiment of the invention will now be described, reference being made to the accompanying drawings, in which:

FIG. 1 is a block schematic diagram of a teletext decoder in accordance with the present invention; and FIG. 2 shows typical waveforms existing in the decoder of FIG. 1.

DESCRIPTION OF THE PREFERRED EMBODIMENT

Figure 1:
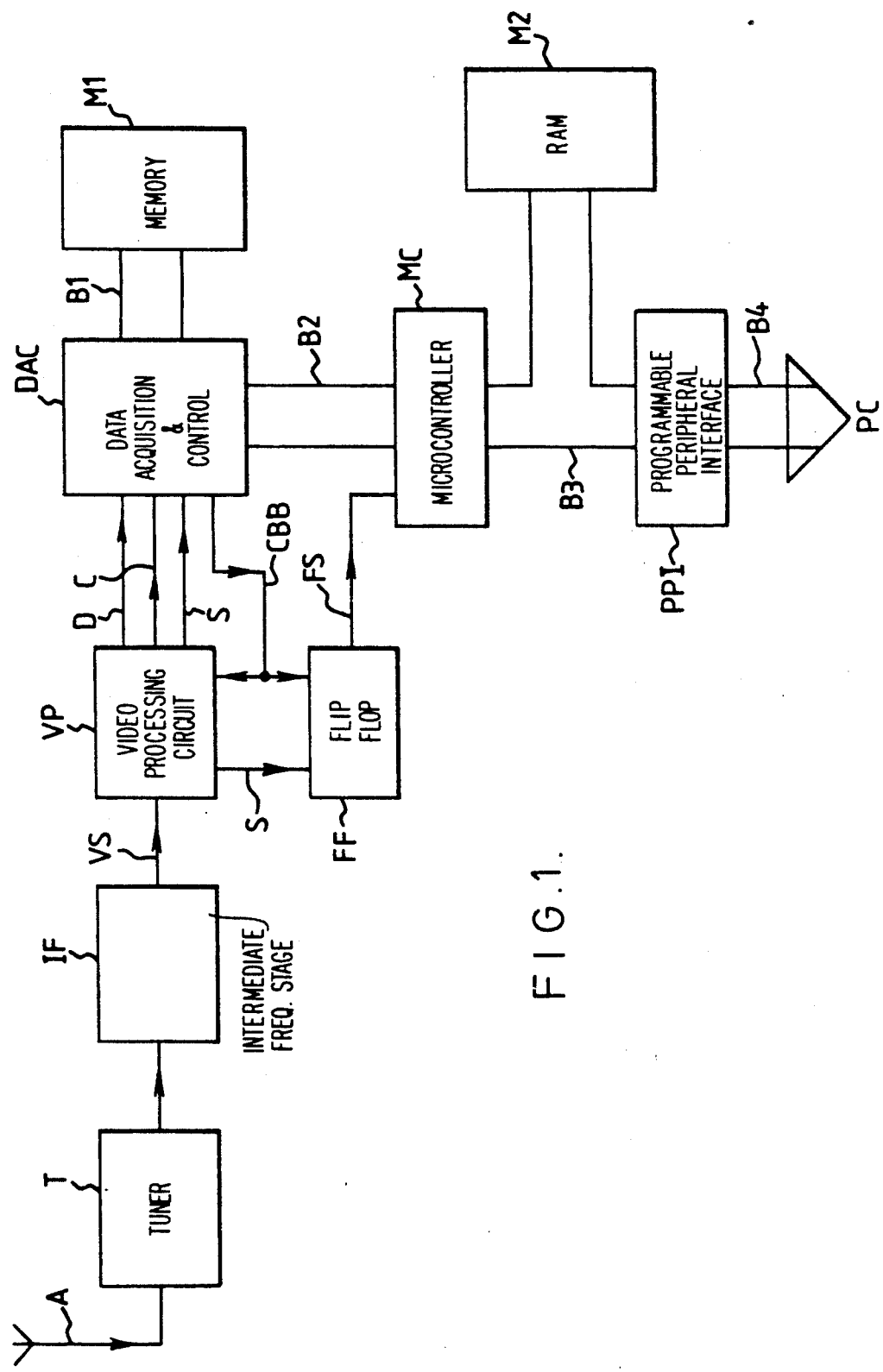

In FIG. 1 of the drawings there is shown a block schematic diagram of a teletext decoder which comprises an antenna A for receiving a teletext transmission, the antenna A being connected to a television tuner T (typically a Philips Components tuner unit type U744) which affords an output to an intermediate frequency stage IF (typically a Philips Components integrated circuit type TDA 2541). The demodulated video signal VS from the intermediate frequency stage IF is applied to a video processing circuit VP (typically a Philips Components integrated circuit type SAA 5231) which performs, among other things, data slicing for retrieving serial teletext data pulses D from the video signal VS. The video processor VP also produces data clock pulses C and line sync pulses S from the video signal VS. The data pulses D together with the clock pulses C and line sync pulses S are fed to a data acquisition and control circuit DAC, which is preferably a Philips Components integrated circuit type SAA 5250. The data acquisition and control circuit DAC operates on the serial teletext data pulses from the video processor VP and converts them into parallel data bytes which are stored in a dedicated first-in, first-out random access memory (typically of 2K × 8 bit), M1, via a multi-bit address and data bus B1.

The data acquisition and control circuit DAC is operated under the control of a microcontroller MC (typically an Intel type 8031) via another multi-bit address and data bus B2 which is itself interconnected with a programmable peripheral interface PPI 8255) and a random access memory (typically a 32K × 8 bit) M2 via a further multi-bit address and data bus B3. In some circumstances buses B2 and B3 may be common. The programmable peripheral interface PPI affords access to a compatible personal computer PC (typically an IBM PC) via a multi-bit address and data bus B4.

One of the functions carried out by the data acquisition and control circuit DAC is to make a framing code check on the data pulses D applied to it from the video processor VP. This is normally done by generating a framing code window in a position where a framing code of a teletext data packet would be expected to occur, and by detecting whether a framing code exists in the data pulses D within the confines of the framing code window. If a framing code is detected, it is assumed that the data packet is valid teletext data and the data packet is stored in the memory M1. If a framing code is not detected it is assumed that the data pulses D do not constitute a valid teletext data packet, and no action is taken to store the relevant data packet.

As has hereinbefore been explained it is possible for non-teletext or "junk" data to mimic teletext data even to the extent that an apparently valid framing code is detected within the framing code window generated within the data acquisition and control circuit DAC, and thereby be passed as teletext data.

The teletext decoder shown in FIG. 1 of the drawings when implemented using the aforesaid Philips Components CIDAC integrated circuit SAA 5250 device as the data acquisition and control circuit DAC makes use of a feature thereof in order to further alleviate the problem of "junk" data.

CIDAC has been designed to operate, as described in the Handbook mentioned above, in either of two modes which may be selected under software control by setting the so-called R1, bit 7 register either high or low (logic 1 or logic 0). When the R1, bit 7 register is set low, CIDAC is set to its SYNC mode in which the framing code window is generated internally and when it is set high CIDAC is set to its VAL mode in which the framing code window is defined by the signal which is applied to CIDAC's VALI/SYNC input.

In practice, CIDAC is normally used in its SYNC mode in which the framing code window is generated internally, and the line sync signal S, from the video processor VP is applied to the VALI/SYNC input of CIDAC in order to define the position of the framing code window in time spaced relationship to the line sync pulse S.

If CIDAC is used in its VAL mode it is necessary to provide additional hardware in order to generate the signal to be applied to CIDAC's VALI/SYNC input in order to define the framing code window.

It has been appreciated however, that if CIDAC is used in its VAL mode with the line sync signal S applied to its VALI/SYNC input, then the framing code window will be generated in the region of the line sync pulse, in which region there is unlikely to occur any signals that could be mistaken for a valid framing code.

It is therefore proposed that CIDAC is used in its SYNC mode in that part of the VBI where teletext data is likely to occur and to use it in its VAL mode in the remaining parts of the video signal where "junk" data is more likely to occur.

Figure 2:
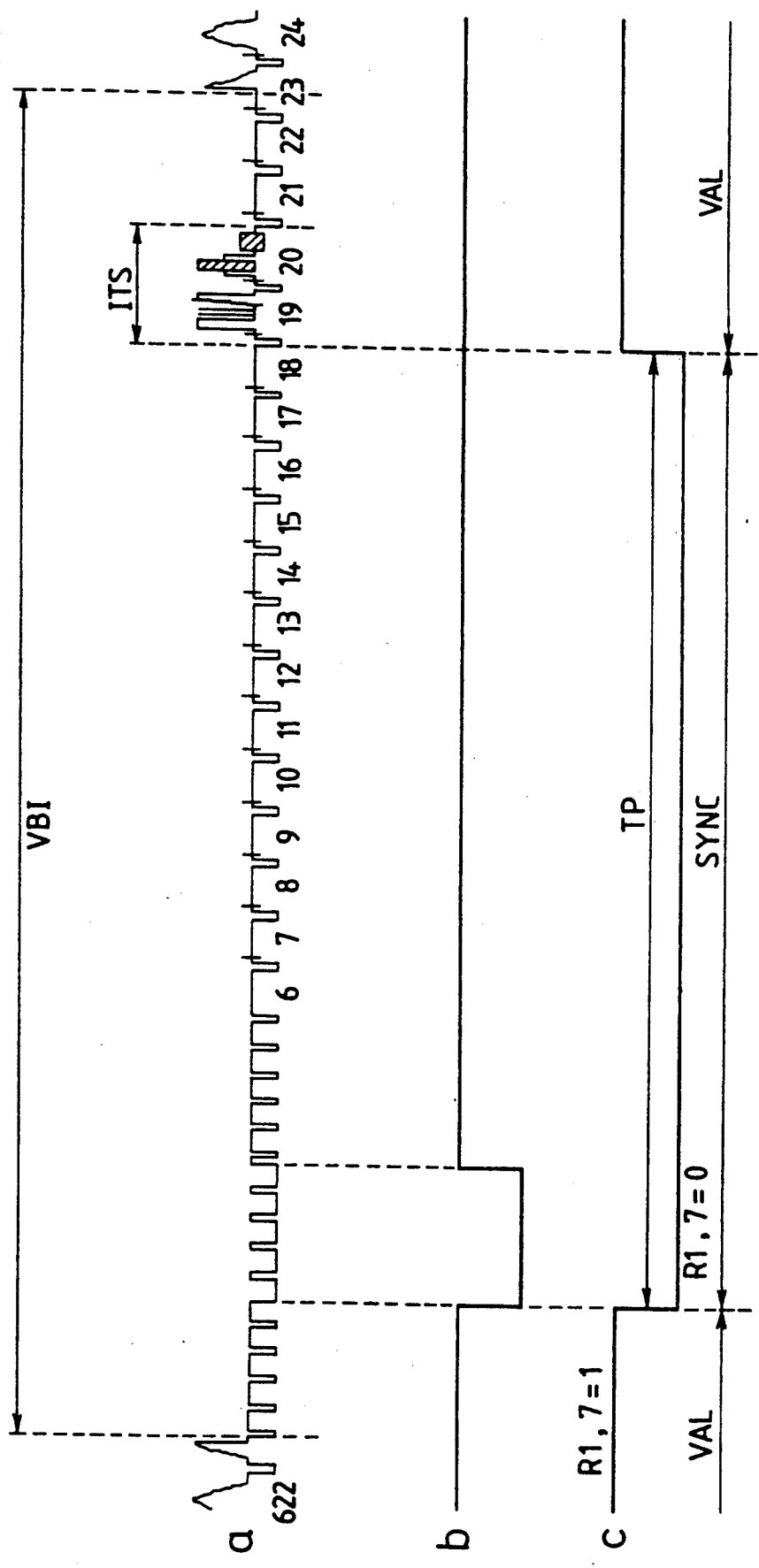

In FIG. 2 of the drawings, in waveform (a) thereof, there is shown one of the two VBI regions of a typical 625 line 50 Hz field rate video waveform as present in the above mentioned Broadcast Teletext Specification. The VBI extends over 25 lines of the video signal from line 623 to line 23. The portion from line 623 to line 6 is used for field synchronizing purpose, lines 19 and 20 are used for the transmission of the Insertion Test Signals (ITS), and the remaining lines, i.e. lines 7 to 18 and lines 21 and 22 are available for use as teletext data lines.

The teletext decoder described with reference to FIG. 1 of the drawing makes use of the field synchronizing portion of line 623 to line 6 to generate a true field sync pulse and this is used to switch CIDAC into its SYNC mode. At the same time, a timer is set running in the microcontroller MC to determine the time period that CIDAC is maintained in the SYNC mode. Typically, this period is arranged to end at the completion of line 18 and before the ITS lines 19 and 20. Thus, at the end of the time period, which corresponds to the completion of line 18, CIDAC is set to its VAL mode.

Generation of the true field sync pulse from the field synchronizing pulses of line 623 to line 6 is effected in FIG. 1 by means of a "D" type flip-flop FF to which the line sync pulses S from the video processor VP is applied and which is clocked by a color burst blanking signal CBB derived within the CIDAC data acquisition and control circuit DAC. This blanking signal CBB is also applied to the video processor VP to reset its data slicing operation in each line. The inverse output from the flip-flop FF affords the true field sync pulse FS, as shown at (b) in FIG. 2, this being applied to the microcontroller MC in order to set CIDAC to its SYNC mode, (R1, bit 7=0) as shown at (c) in FIG. 2, and also to set the timer therein running. At the end of the time period TP (FIG. 2(c)) CIDAC is set to its VAL mode (R1, bit 7=1) by the microcontroller MC.

In this way, CIDAC is set to its SYNC mode during lines 7 to 18 of the video signal depicted at (a) in FIG. 1, these lines being teletext data lines, in which mode the framing code window is generated internally thereof in a position where a framing code would be expected to be received in the teletext data packets contained in the respective data lines. When CIDAC is set to its VAL mode, which occurs during the Insertion Test Signal lines 19 and 20 and also the normal picture lines, the framing code window generated by CIDAC is defined by the line sync pulses S applied to its VALI/SYNC input and is therefore generated in the vicinity of the line sync pulses S, in which region "junk" data is unlikely to exist. In this way, the problem of "junk" data is greatly alleviated.

In the above described embodiment the CIDAC data acquisition and control circuit DAC is held in its SYNC mode for a timed period under the control of the microcontrolleer MC such that it returns to its VAL mode prior to the commencement of the ITS lines. This is quite satisfactory when the decoder is used with a transmission system where the position of the ITS lines are fixed for that system. However, a decoder may be required to operate in a number of countries where the position of ITS lines differs from country to country. In such a case the decoder may be provided with means for determining when ITS lines are present, which could be by sensing the repetitive nature of the contents of these lines, or where teletext lines are not present which could be achieved by checking for the absence of the clock run-in pulses normally present in each teletext line. This means could then be used to control the microcontroller MC to set the CIDAC to its SYNC and VAL modes at appropriate times during the field blanking period.

Although in the aforedescribed embodiment use is made of the dual mode feature of CIDAC in order to achieve change in position of the framing code window, it will be appreciated that other ways of doing this may be used.

From reading the present disclosure, other modifications will be apparent to persons skilled in the art. Such modifications may involve other features which are already known per se and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalization or modification thereof which would be apparent to persons skilled in the art, whether or not it relates to the same invention as presently claimed in any claim and whether or note it mitigates any or all of the same technical problems as does the present invention. The applicants hereby reserve the right to formulate new claims to such features and/or combinations of such features during the prosecution of the present application or of any further application derived therefrom.

What is claimed is:

1. A teletext decoder for use in a receiver which is suitable for receiving teletext transmissions of a type in which coded data pulses representing teletext data packets are transmitted in a television signal in respective television lines where no picture signals representing normal picture information are present, said teletext decoder comprising framing code detection means operable on signals which are derived from respective line signal portions of the television signal for detecting a framing code therein in a predefined framing code window and means for changing the position of said framing code window in a television line in respect of signals which are derived from line signal portions in said television signal where teletext data packets do not occur, whereby the chances of detecting an apparently valid framing code in non-teletext signals are reduced.

2. A teletext decoder as claimed in claim 1, wherein said means for changing the position of said framing code window is effective for moving it to a position where a framing code cannot exist in said non-teletext signals.

3. A teletext decoder as claimed in claim 2, wherein the framing code detection means forms part of a data acquisition and control arrangement.

4. A teletext decoder as claimed in claim 3, wherein said data acquisition and control arrangement is operable in a first mode in which said framing code window is generated internally therein, and in a second mode in which said framing code window is defined by an applied signal.

5. A teletext decoder as claimed in claim 4, wherein in said first mode, said framing code window is generated in time spaced relationship to an applied line sync signal and in that in said second mode it is derived directly from said applied line sync signal.

6. A teletext decoder as claimed in claim 5, wherein in said second mode the duration of said framing code window is changed to substantially that of the applied line sync signal.

7. A teletext decoder as claimed in claim 5 including means for generating a field sync signal from the television signal for causing said data acquisition and control arrangement to operate in its said first mode, and means operable a predetermined time period after said field sync signal occurs for causing said data acquisition and control arrangement to operate in its second mode, said predetermined time period corresponding to a predetermined number of lines in said television signal in which said teletext data packets can occur.

8. A teletext decoder as claimed in any one of claims 1 to 6 or claim 12, in which said transmissions also contain television lines, particularly during the vertical blanking intervals which convey test signals, wherein said decoder additionally comprises means for detecting the presence of said test signal lines and for causing said framing code window to occupy its changed position during those lines.

9. A teletext decoder as claimed in claim 1, wherein the decoder additionally comprises means for detecting television lines which do not contain teletext data packets and for causing said framing code window to occupy its changed position during those lines.

10. A teletext decoder as claimed in claim 9, wherein said means for detecting non-teletext lines determines whether television lines do or do not contain clock run-in pulses of a teletext data packet.

11. A teletext decoder as claimed in claim 6 including means for generating a field sync signal from the television signal for causing said data acquisition and control arrangement to operate in its first mode, and means operable a predetermined time period after said field sync signal occurs for causing said data acquisition and control arrangement to operate in its second mode, said predetermined time period corresponding to a predetermined number of lines in said television signal in which said teletext data packets can occur.

12. A teletext decoder as claimed in claim 2 wherein the decoder additionally comprises means for detecting television lines which do not contain teletext data packets and for causing said framing code window to occupy its changed position during those lines.

13. A teletext decoder as claimed in claim 3 wherein the decoder additionally comprises means for detecting television lines which do not contain teletext data packets and for causing said framing code window to occupy its changed position during those lines.

14. A teletext decoder as claimed in claim 4 wherein the decoder additionally comprises means for detecting television lines which do not contain teletext data packets and for causing said framing code window to occupy its changed position during those lines.

15. A teletext decoder as claimed in claim 5 wherein the decoder additionally comprises means for detecting television lines which do not contain teletext data packets and for causing said framing code window to occupy its changed position during those lines.

16. A teletext decoder as claimed in claim 6 wherein the decoder additionally comprises means for detecting television lines which do not contain teletext data packets and for causing said framing code window to occupy its changed position during those lines.

17. A teletext decoder as claimed in claim 7 wherein the decoder additionally comprises means for detecting television lines which do not contain teletext data packets and for causing said framing code window to occupy its changed position during those lines.

18. A teletext decoder as claimed in claim 8 wherein the decoder additionally comprises means for detecting television lines which do not contain teletext data packets and for causing said framing code window to occupy its changed position during those lines.

19. A teletext decoder as claimed in claim 11 wherein the decoder additionally comprises means for detecting television lines which do not contain teletext data packets and for causing said framing code window to occupy its changed position during those lines.

20. A method of processing a received teletext transmission of a type in which coded data pulses representing teletext data packets are transmitted in a television signal in respective television lines where no picture signals representing normal picture information are present, said method comprising the steps of generating a framing code window, detecting a framing code in said framing code window in signals which are derived from respective line signal portions of the television signal, and changing the position of said framing code window in a television line in respect of signals which are derived from line signal portions of said television signal where data packets do not occur, whereby the chances of detecting an apparently valid framing code in non-teletext signals are reduced.

* * * * *